United States Patent [19]

Beechick

[11] Patent Number: 5,218,700

[45] Date of Patent: Jun. 8, 1993

[54] APPARATUS AND METHOD FOR SORTING A LIST OF ITEMS

[76] Inventor: Allen Beechick, 6178 Bucktail La., Pollock Pines, Calif. 95726

[21] Appl. No.: 472,303

[22] Filed: Jan. 30, 1990

[51] Int. Cl.⁵ .............................................. G06F 7/08
[52] U.S. Cl. ................................. 395/700; 364/222.9; 364/259.2; 364/262.5; 364/DIG. 1
[58] Field of Search ................. 364/200, 900; 395/700

[56] References Cited

U.S. PATENT DOCUMENTS

| | | | |
|---|---|---|---|
| 3,311,892 | 3/1967 | O'Connor et al. | 340/172.5 |
| 4,809,158 | 2/1989 | McCauley | 364/200 |
| 5,060,146 | 10/1991 | Chang et al. | 364/900 |

OTHER PUBLICATIONS

Knuth, The Art of Computer Programming, vol. 3 Sorting and Searching, 1973 pp. 170-180.
Greenfield et al, Using Microprocessors and Microcomputers, The 6800 Family, 1981, pp. 236-239 and 453.
Nagle, Jr. et al, An Introduction to Computer Logic, 1975 pp. 203-206.
Nagler, Amphisbaenic Sorting, Journal of Association for Computing Machinery, Oct. 27, 1959, pp. 459-468.

*Primary Examiner*—Thomas M. Heckler
*Assistant Examiner*—Dennis M. Butler

[57] ABSTRACT

Method and apparatus for sorting a stream of data such as a numerical or alphabetical list by stratifying vis-a-vis a hierarchal system thereby providing a list of items. This method begins with an unsorted list. For example, if a field of data is to be alphabetized, it groups words letter by letter, and it ends up with a sorted list. The sorting begins by grouping words according to their first letter. All words that begin with the same letter end up in the same group. The first group typically contains all words that begin with "A" if words are sorted or "1" if numbers are sorted. This method then takes the first group and re-groups it according to the second letter. The first group is thereby subdivided into smaller groups. Re-grouping continues in this fashion until the first group contains only one item. That one item is now sorted and it becomes the first item in the new sorted list. Re-grouping continues group by group and letter by letter until the entire list is sorted. Computer use is kept minimal by accounting for the location of unsorted, sorted or partially sorted items and elements comprising respectively (for example) a word and a letter in the word. By accounting using a location with directions to another location reflecting subsequent items to be sorted less memory is used than by traditional techniques and less time is required for sorting.

3 Claims, 9 Drawing Sheets

Figure 4 word
  number 1    starting value of lettertracker [1,C] = 0
  CONNOR      values of wordtracker              0
              indexes of wordtracker             [1]  [2]  [3]  [4]  [5]  [6]  [7]
              new value of lettertracker [1,C] = 1
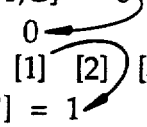

word
  number 2    starting value of lettertracker [1,A] = 0
  ADAMS       values of wordtracker              0    0
              indexes of wordtracker             [1]  [2]  [3]  [4]  [5]  [6]  [7]
              new value of lettertracker [1,A] = 2
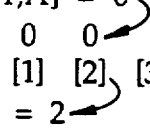

word
  number 3    former value of lettertracker [1,A] = 2
  ALLEN       values of wordtracker              0    0    2
              indexes of wordtracker             [1]  [2]  [3]  [4]  [5]  [6]  [7]
              new value of lettertracker [1,A] = 3
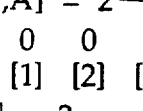

word
  number 4    starting value of lettertracker [1,B] = 0
  BURNS       values of wordtracker              0    0    2    0
              indexes of wordtracker             [1]  [2]  [3]  [4]  [5]  [6]  [7]
              new value of lettertracker [1,B] = 4
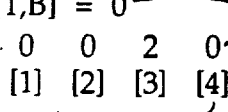

word
  number 5    former value of lettertracker [1,A] = 3
  ADCOCK      values of wordtracker              0    0    2    0    3
              indexes of wordtracker             [1]  [2]  [3]  [4]  [5]  [6]  [7]
              new value of lettertracker [1,A] = 5
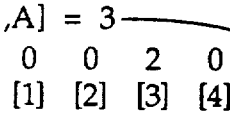

word
  number 6    former value of lettertracker [1,B] = 4
  BROWN       values of wordtracker              0    0    2    0    3    4
              indexes of wordtracker             [1]  [2]  [3]  [4]  [5]  [6]  [7]
              new value of lettertracker [1,B] = 6
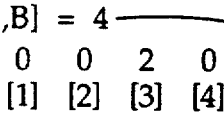

word
  number 7    former value of lettertracker [1,A] = 5
  ANDERSON    values of wordtracker              0    0    2    0    3    4    5
              indexes of wordtracker             [1]  [2]  [3]  [4]  [5]  [6]  [7]
              new value of lettertracker [1,A] = 7
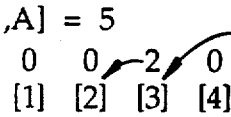

All the "A" words are linked together by their numbers (see arrows). These numbers (7, 5, 3, 2) will be used to locate the words for the second sorting pass.

Figure 5 lettertracker [1,A] = 7 (This value points to the first word in the group.)

word
  number 7    starting value of lettertracker [2,N] = 0
ANDERSON  former values of wordtracker   0   0   2   0   3   4   5
                new values of wordtracker     0   0   2   0   3   4   0
                indexes of wordtracker       [1]  [2]  [3]  [4]  [5]  [6]  [7]
                new value of lettertracker [2,N] = 7 word
  number 5    starting value of lettertracker [2,D] = 0
ADCOCK    former values of wordtracker   0   0   2   0   3   4   0
                new values of wordtracker     0   0   2   0   0   4   0
                indexes of wordtracker       [1]  [2]  [3]  [4]  [5]  [6]  [7]
                new value of lettertracker [2,D] = 5 word
  number 3    former value of lettertracker [2,L] = 0
ALLEN      former values of wordtracker   0   0   2   0   0   4   0
                new values of wordtracker     0   0   0   0   0   4   0
                indexes of wordtracker       [1]  [2]  [3]  [4]  [5]  [6]  [7]
                new value of lettertracker [2,L] = 3 word
  number 2    former value of lettertracker [2,D] = 5
ADAMS     former values of wordtracker   0   0   0   0   0   4   0
                new values of wordtracker     0   5   0   0   0   4   0
                indexes of wordtracker       [1]  [2]  [3]  [4]  [5]  [6]  [7]
                new value of lettertracker [2,D] = 2

All the "AD" words are linked together by their numbers 2 and 5. These will be used to locate the words for the third sorting pass.

Figure 6 lettertracker [2,D] = 2 (This value points to the first word in the group.)

word
 number 2    starting value of lettertracker [3,A] = 0
 ADAMS       former values of wordtracker    0   5   0   0   0   4   0
             new values of wordtracker       0   0   0   0   0   4   0
             indexes of wordtracker         [1] [2] [3] [4] [5] [6] [7]
             new value of lettertracker [3,A] = 2 word
 number 5    starting value of lettertracker [3,C] = 0
 ADCOCK      former values of wordtracker    0   0   0   0   0   4   0
             new values of wordtracker       0   0   0   0   0   4   0
             indexes of wordtracker         [1] [2] [3] [4] [5] [6] [7]
             new value of lettertracker [3,C] = 5

All value of 0 (zero) in wordtracker reveals the last word in a group.

Figure 7 lettertracker [1,B] = 6 (This value points to the first word in the group.)

word
  number 6    starting value of lettertracker [2,R] = 0
BROWN     former values of wordtracker  0    0    0    0    0    4    0
                new values of wordtracker    0    0    0    0    0    0    0
                indexes of wordtracker       [1]  [2]  [3]  [4]  [5]  [6]  [7]
                new value of lettertracker [2,R] = 6 word
  number 4    starting value of lettertracker [2,U] = 0
BURNS      former values of wordtracker  0    0    0    0    0    0    0
                new values of wordtracker    0    0    0    0    0    0    0
                indexes of wordtracker       [1]  [2]  [3]  [4]  [5]  [6]  [7]
                new value of lettertracker [2,U] = 4

Wordtracker contains all 0 (zero) values when all words have been categorized as much as possible.

APPARATUS AND METHOD FOR SORTING A LIST OF ITEMS

BACKGROUND OF THE INVENTION

1. Field of the Invention

This invention relates generally to classifying and sorting systems and, more specifically, to a system for sorting alphanumeric character strings or other types of data having preassigned hierarchal value systems.

2. Prior Art

One of the most common uses for computer systems is sorting. Sorting numeric strings, such as zip codes, allows addresses to be grouped by zip code for more convenient handling of the mail. Sorting alphabetical strings, such as people's last names, allows the printing of directories in alphabetical order.

An important advantage of using a computer for sorting is that computers can sort faster than a person can sort by hand. But even computers take time to sort. Depending on how long the list is, a sorting process may take from several seconds to several minutes. Computer programmers have developed several methods for sorting by computer. Some methods are faster and some methods are slower. People keep trying to find faster methods of sorting.

The operation of one, known prior art technique uses compares. A compare is an operation that compares two items to determine which is "greater" and which is "lesser". Typically, a word beginning with "A" is lesser (i.e. has a different value on a scale such as the alphabet) than a word beginning with "B". If the lesser word comes after the greater word in the list, then the word is out of order. After the compare operation, the words are put into their proper order. According to the operation of prior art, computers have no way of knowing how to order a list of items without using compares.

A major shortcoming of using compares is that the longer the list, the longer the sorting time. A list of two items requires only one compare, namely the comparison between the two items. But a list of three items requires that the first item be compared to each of the other two, and the remaining two items need to be compared to each other, for a total of three compares. Therefore, increasing the length of the list multiplies the number of compares. The larger the list, the larger is the multiplication of compares. Adding just one item to a list of 100 items does not require just one more compare, but rather it requires that the additional item be compared in some way to each of the other 100 items. Adding only one item to a list 1,000 long requires up to 1,000 additional compares. A formula which calculates the number of compares is $N \times N/2$, where N is the number of items in the list. Prior methods have devised shortcuts to reduce the number of compares somewhat. This has resulted in an improved formula, $N \times \log(\text{base } 2)$ (N), where N is the number of items in the list. But all of these methods, even the most improved methods, still work under the same mathematical disadvantage of the compare method of sorting.

SUMMARY OF THE INVENTION

The present invention is not a new twist on this old method, but it is an entirely new way of sorting using the computer. Instead of using compares, the present invention categorizes words according to letter.

The result is a dramatic reduction in time that the sorting process requires. The longer the list, the greater is the percentage of time that is saved. Since this invention does not use compares, it has no formula to calculate the number of compares. However, there is a formula which approximates the number of sorting operations, a sorting operation being defined as looking at a word and placing it into a category. The formula is $N \times \log(\text{base } x)$ (N), where x is the range of values that individual characters can take, such as 26 for alphabetical sorting, or 10 for numerical sorting, and where N is the total number of words in the list to be sorted. This formula approximates the number of sorting passes, because lists may have words clustered in unpredictable configurations. For example, a list may have an overabundance of As and an absence of Zs. In the event of such configurations, the number of sorting operations will be somewhat more than the formula approximates, but it will still be far less than prior art has been able to achieve. The very fact that prior art uses formulas with log(base 2) and this invention's formula uses a log with a much higher base shows that it saves time in exponential increments.

FIG. 2 is a flow chart that summarizes this sorting method.

The first sorting pass looks at the first letter of each word when sorting by the alphabet. For example, a word beginning with "A" goes into the "A" category. This eliminates the need to compare it to all the other words. Instead, words are placed into their proper position according to the twenty six letters of the alphabet. All the words beginning with "A" go into the "A" category, all the words beginning with "B" go into the "B" category, and so on. At the end of the first sorting pass, all the As are grouped together, all the Bs are grouped together, all the Cs are grouped together, and so on.

The second sorting pass looks at the second letter of each word in the "A" group. The words go into new groups according to their second letter.

The third sorting pass looks at the third letter of the first of these new groups. In this fashion, the words are categorized letter by letter into smaller and smaller groups. At any time that the first group contains only one word, then that word is sorted, and that word is added to the list of sorted words. The present invention then takes the next group of words and regroups them into smaller groups according to the next letter.

Once all of the original "A" group has been sorted, so that each word is in proper order in a new sorted list, then the present invention takes the "B" group and does the same thing. Even though the process may have looked at the third or fourth letter in some words of the "A" group, it now backs up and looks at the second letter of the "B" group. That is because the "B" group has been grouped only by the first letter so far, and so the appropriate letter to look at next is the second letter. The present method always looks at the appropriate letter for the appropriate group. First it looks for the appropriate group, and second, it looks at the appropriate letter for that group. In other words, this invention looks for the first group, and then it regroups that group by the next letter. This regrouping process results in sets of words and subsets of words. In this way, each word finds its own category and is sorted in alphabetical order.

OBJECTS OF THE INVENTION

Accordingly, it is a primary object of the present invention to provide a novel automated sorting system which is simple in concept and easy in use.

A further object of the present invention is to provide a system as characterized above wherein an improved and faster means, than is presently known in the art, is provided for sorting of data by a computer.

A further object of the present invention is to provide a system as characterized above which is easy to manufacture and lends itself to mass production.

A further object of the present invention is to provide a system as characterized above wherein said system may be coupled with an optical scanner for the sorting of mail by its zip code.

A further object of the present invention is to provide a system a characterized above such that when said system is coupled with said optical scanner 1 group of mail can be sorted into 10 groups on each of 5 passes for a total of 10,000 groups with the utilization of only 5 passes through said scanner.

Viewed from a first vantage point, it is an object of the present invention to provide an automated sorting system wherein an input means for receiving commands and providing electronic signals is provided. Said electronic signals represents a plurality of quantized characters defining words or numbers. The input means is coupled with a memory means for storing of binary representations groups of said words or numbers. Said input and memory means is coupled with a processing means for the sorting of groups of words or numbers by first subdividing the groups into subgroups and by successive subdivision of the subgroups until only one word or number is in a subgroup.

Viewed from a further vantage point, it is an object of the present invention to provide a system as characterized above wherein a reading means is provided within the processing means whereby reading and sorting of words or numbers can be accomplished from the memory means.

Viewed from a further vantage point, it is an object of the present invention to provide a system as characterized above wherein a writing means is provided within the processing means whereby words or numbers can be written from the memory means to a display.

Viewed from a further vantage point, it is an object of the present invention to provide a system as characterized above wherein a first and a second logic means is provided within the memory means. Said first logic means puts words or numbers into categories according to individual characters contained in said words or numbers. Said second logic means remembers and recalls said categories of words or numbers in alphabetical order.

Viewed from yet a further vantage point, it is an object of the present invention to provide a system as characterized above wherein the display means is comprised of a printer which in turn is utilized to print said sorted data.

Viewed from yet a further vantage point, it is an object of the present invention to provide a method for sorting lists formed from a series of alphanumeric characters defining words or numbers wherein each word or number is assigned a word number in order of appearance on the list. The word numbers of each word or number are then stored in the memory means, and subsequently assigning individual alphanumeric characters contained in the word or number a letter value, said letter value is used to stratify said list according to the individual characters contained in the word or number. Said letter value is stored in memory such that individual words or numbers can be individually remembered and recalled in a sequence for further processing.

It is a further object of the present invention to provide a system as characterized above wherein the letter values are used to indicate memory indexes of a lettertracker such that the words or numbers are grouped in memory according to the letter value of a character contained within a word or number and also storing the word number of the word or number in the memory of said lettertracker such that each said index of said lettertracker corresponds not only to said letter value of an individual character in said word or number but also to the appearance location on the list, thus providing a way to recall said words or numbers for further processing.

It is a further object of the present invention to provide a device as characterized above wherein two numerical values are stored in a wordtracker such that both numerical values correspond to a counter for said wordtracker so that words are linked together in said wordtracker by a series of numerical values and counters. The first alphanumeric character in a word and the numerical value stored in the lettertracker to the counter of wordtracker are matched, thus the first word in a group is used to recall from memory the rest of the words in said group, each numerical value corresponding to a counter of wordtracker, at which memory location another numerical value is stored, which corresponds to the next counter and so on, until all words or numbers are recalled. The values of wordtracker are changed as the words or numbers are recalled so that the words or numbers are subdivided into smaller categories, each smaller category being linked together by the new changed values and counters in wordtracker and repeating the subdivision of the categories of words or numbers into smaller groups, categorizing character by character according to the character's position in the word or number, until only one word or number remains in each group, thus the words or numbers alphabetically sorted and a sorted list is provided.

Viewed from a further vantage point, it is an object of the present invention to provide a system as characterized above wherein a method for alphabetizing a series of words is provided such that the words are entered into a computer, the first letter of each word is compared to a hierarchal alphabet, each word is segregated into categories based on similar first letters, further segregating the words in each category into further subcategories based on successive letters in the word until each subcategory has only one word, and displaying or printing the subcategories in alphabetical order.

Viewed from a yet another vantage point, it is an object of the present invention to provide a system as characterized above wherein a method for stratifying a series of numbers is provided such that the numbers are entered into a computer, a numeral of each number is compared to a hierarchal stratus, each number is segregated into categories based on similar first numerals, further segregating the numbers in each category into further subcategories based on successive numerals in the number until each subcategory has only one number, and displaying or printing the subcategories in numerical order.

BRIEF DESCRIPTION OF THE DRAWINGS

FIG. 4 is an example of a first sorting pass wherein word numbers 27 are stored into lettertracker 30 and also stored into wordtracker 32. The words are categorized according to their first letter.

FIG. 5 is an example of a second sorting pass wherein word numbers 27 are stored into lettertracker 30 and also stored into wordtracker 32. All words beginning with "A" are categorized according to their second letter.

FIG. 6 is an example of a third sorting pass wherein word numbers 27 are stored into lettertracker 30 and also stored into wordtracker 32. All words beginning with "AD" are categorized according to their third letter.

FIG. 7 is an example of a fourth sorting pass wherein word numbers 27 are stored into lettertracker 30 and also stored into wordtracker 32. All words beginning with "B" are categorized according to their second letter.

DETAILED DESCRIPTION OF THE INVENTION

Notation and Nomenclature

The detailed description which follows is presented largely in terms of constants and variables, terms used by those skilled in programming to most effectively convey the substance of their work to others skilled in the art.

A constant is the name of a location in a computer's memory that contains information that remains the same throughout the operation.

A variable is the name of a location in a computer's memory that contains information that may change during the operation of a program. A variable is like a cubbyhole in which items are stored temporarily.

Variables are of different types, designed to hold certain kinds of information. Some variables contain alphanumeric strings, others contain integers. A variable can be strung together in an array, just as there can be an R×C matrix, where R connotes Rows and C connotes Columns. Each such variable has one name but has different index numbers to identify each storage space. A variable can be a two-dimensional array, just as there can be rows and columns of cubbyholes arranged vertically and horizontally. Such a variable has one name but has two different index numbers to identify each storage space. These index numbers are customarily shown in brackets following the variable name. In the following description, each index is called by its own name in order to keep the various indexes from being confused. The names that will be used are counter, incremental advancer, word number, and memory position. These terms will be defined as the variable arrays with which they are associated are defined.

Three or multidimensional arrays are also contemplated.

DETAILED DESCRIPTION

The following detailed description is divided into several sections. The first of these discloses the general configuration of a system for sorting data. Later sections address specific aspects of the present invention including the constants and variables used, the first sorting pass, and the second and repeated sorting passes.

GENERAL SYSTEM CONFIGURATION

Figure 1:
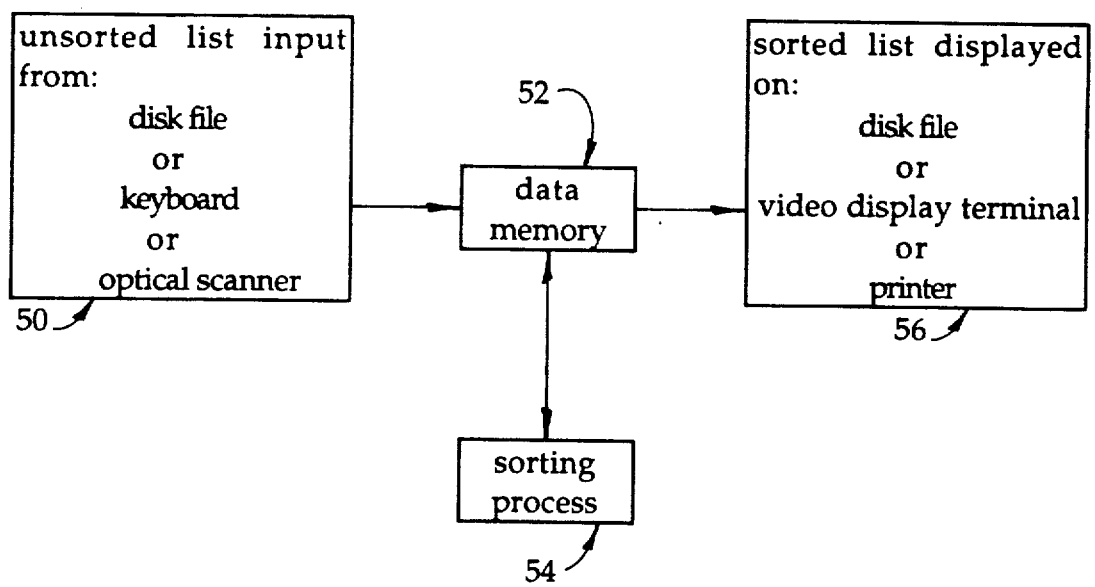
FIG. 1 is a block schematic view of the input, processing and output systems of the sorting invention.
Figure 2:
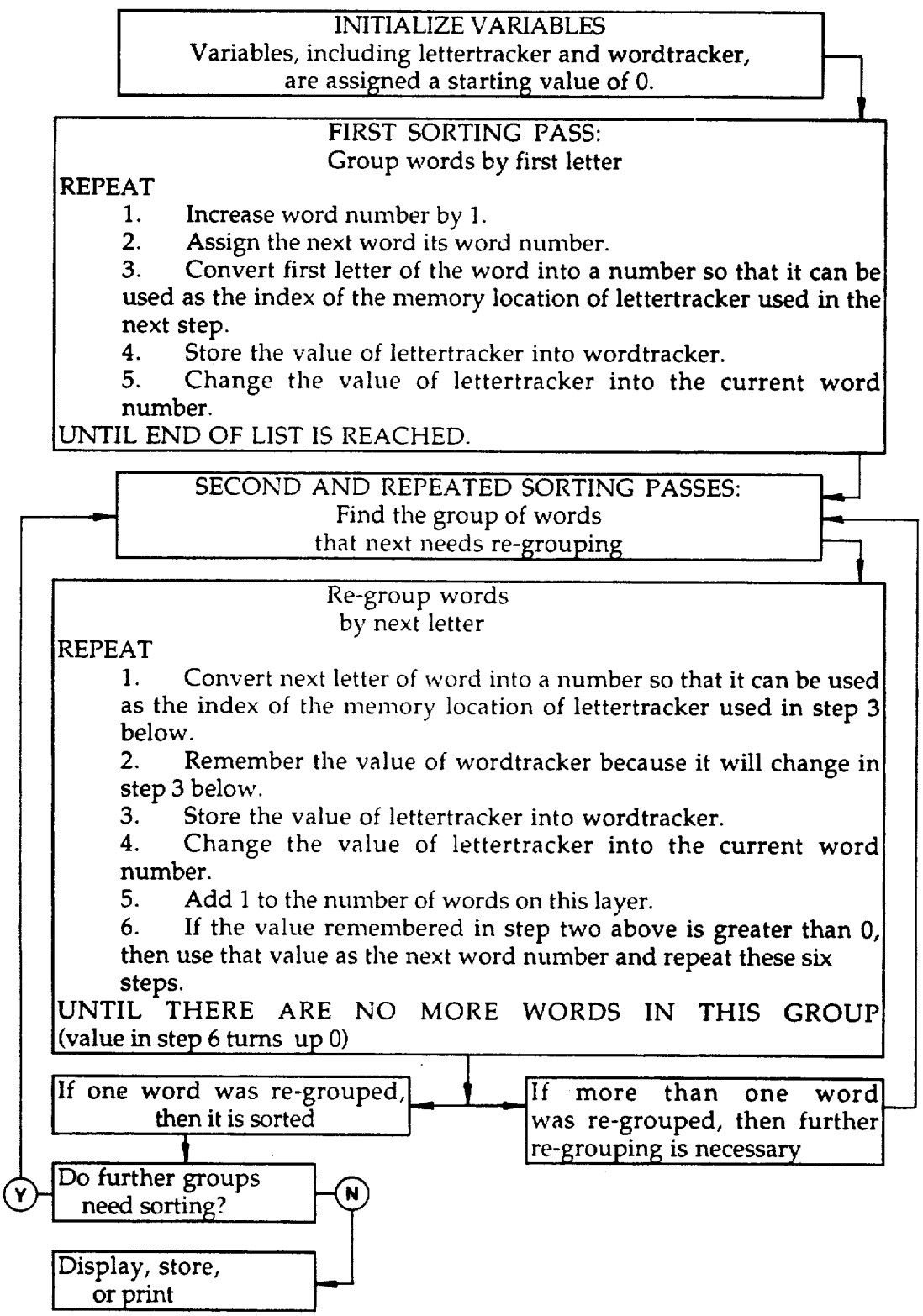
FIG. 2 is a flowchart of the sorting method.
Figure 3:
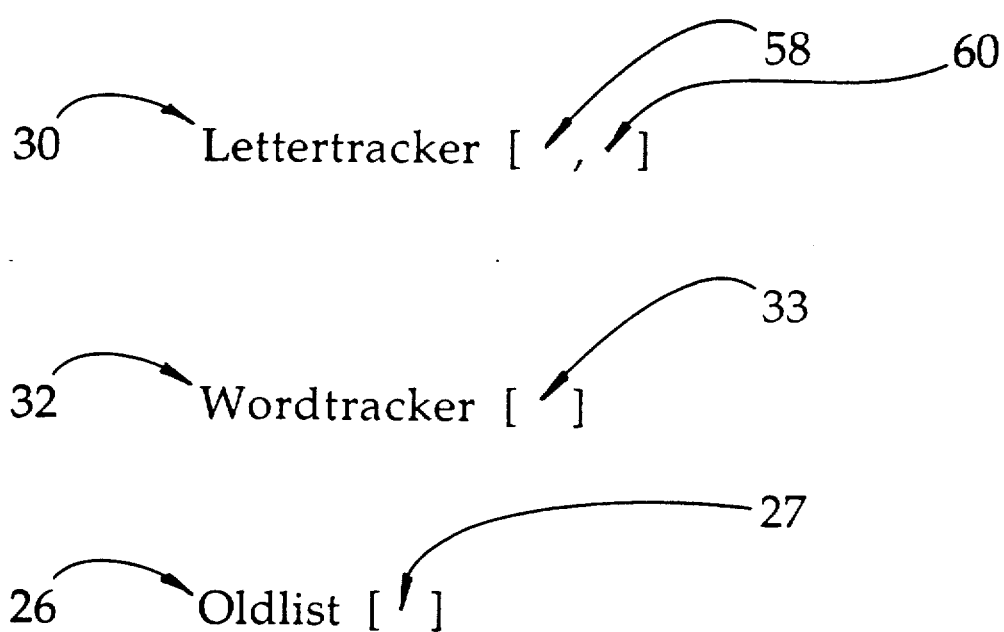
FIG. 3 is a view of the indexes of lettertracker 30, the counter of wordtracker 32, and the word number of oldlist 26 that are depicted in FIGS. 4 through 7.
Figure 8:
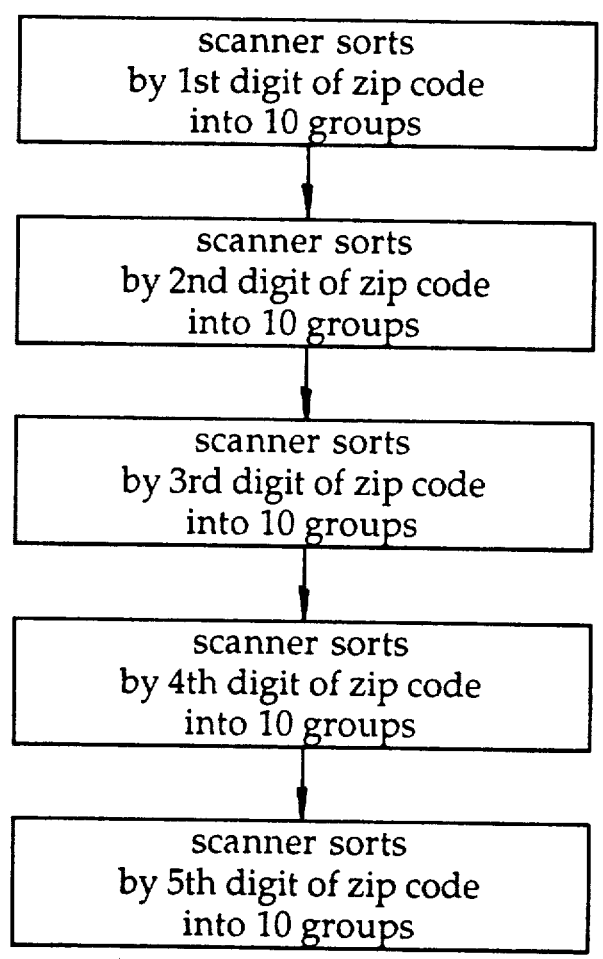
FIG. 8 is an example of the invention in use with an optical scanner, wherein mail is passed through the scanner and said scanner looks at one digit of the zip code at one time, sorting the mail into 10 groups in each of five passes, for a total of 100,000 groups in only five passes.
Figure 9:
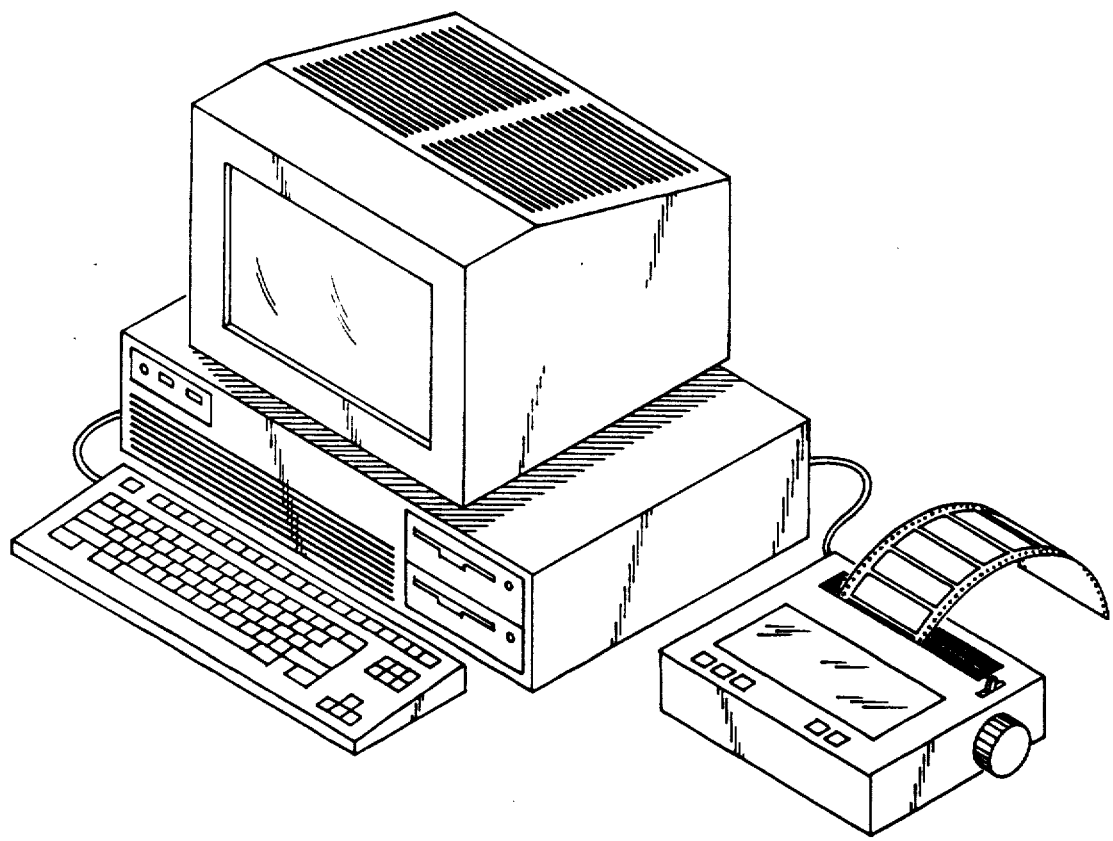
FIG. 9 is a depiction of the apparatus according to the present invention.

FIG. 1 is a block diagram illustrating the preferred embodiment to the present invention. The system includes input means 50, data memory 52, sorting process 54, and display means 56.

Data to be sorted is entered into the system through the input means 50. This data is stored in data memory 52 until the sorting process 54 is completed. Then the sorted data is sent to the display means 56.

CONSTANTS AND VARIABLES USED

The names given to the constants and variables that follow are given for illustrative purposes. The names can change without affecting the principle of the present invention.

The present illustrative embodiment uses three constants. First, maximum-word-length 20 is an integer that the programmer sets to any value that will be long enough to hold the longest word in the list. For example, a zip code sort needs a maximum-word-length 20 of 9, because zip codes can be 9 characters long.

Second, maximum-number-of-words 22 is an integer that the programmer sets to any value at least as large as the list that will be sorted. For example, if a list of 500 names will be sorted, then maximum-number-of-words 22 should be set to at least 500 to insure that there will be enough storage spaces for all 500 names.

Third, starting-letter 24 is an integer which indicates at which letter to start sorting. Each character has a standard numerical code according to the American Standard Code for Information Interchange (ASCII). These are numbered from 0 to 255. These numbers correspond to characters produced by a computer. For example, the capital letter "A" has a value of 65 and the capital letter "B" has a value of 66. The other letters of the alphabet have values in ascending order. Therefore, starting-letter 24 must be set low enough to be below the lowest value that will be sorted. Since a space also has an ASCII value, namely 32, it is recommended that starting-letter 24 be set to 31. If starting-letter 24 were set to −1 (negative one), then the sorting operation would still work, but it would take a little longer. For a zip code sort in which there are no spaces, a value of 47 is recommended for starting-letter 24, because the characters 0 through 9 have an ASCII values of 48 through 59. In other words, starting-letter 24 should be set to the highest value possible and still be lower than all characters that will be sorted.

The preferred embodiment of the present invention includes two variable arrays that contain alphanumeric strings. First, oldlist 26 is an array that contains the original unsorted list of words. These words are customarily read from a disk file but can also be typed in from a keyboard. Each word is assigned a word number 27 so that the location of each word is known. For example, oldlist[3] 26 contains the third word. Second, newlist 28 is an array that contains the new sorted list. It starts out empty, but fills up one by one during the sorting process. For example, newlist[1] 28 will contain the first word that alphabetically comes before all the other words. Of these two variables, oldlist 26 is vital to the operation of this invention, while newlist 28 is not. Newlist 28 is merely a convenient place to store the words as they are sorted. Instead of storing the sorted words in newlist 28, it is possible to write the words onto a video display terminal, send them to a printer in order to print mailing labels, or store them on disk. Oldlist 26 is vital because the present invention uses its word numbers 27 to locate words in oldlist 26.

In addition to variable arrays that contain alphanumeric strings, the preferred embodiment of the present invention also includes variable arrays that contain integers. First, lettertracker 30 is a two-dimensional array that contains integers which correspond to the word numbers 27 of oldlist 26. The first dimension of this array uses a first index 58 corresponding to the position of a letter in a word. For example, the first letter in a word corresponds to index 1. The second dimension of this array uses a second index 60 corresponding to the ASCII value of a letter. For example, the capital letter "A" corresponds to index 65. Suppose that the third word in oldlist 26 is "ALLEN". Lettertracker[1,65] 30 contains a value of 3. The 1 corresponds to letter one of "ALLEN", the 65 corresponds to the value of the "A", and 3 corresponds to the location of "ALLEN" in oldlist 26. The value of lettertracker 30 changes during the sorting process, as will be shown later. For example, if the fifth word in oldlist 26 is "ADCOCK", then the value of lettertracker[1,65] 30 becomes 5.

A second variable array that contains integers is wordtracker 32. Wordtracker 32 is an array that is as long as oldlist 26 is long, because wordtracker 32 has to be able to contain all the integers that correspond to locations of words in oldlist 26. Wordtracker 32 uses a counter 33 to keep track of all its memory locations. Wordtracker 32 is a larger array than lettertracker 30, because lettertracker 30 does not have to contain all the values at once.

The use of these two variables, wordtracker 32 and lettertracker 30, and how they store integers, makes the operation of this invention possible in the limited memory of a computer.

A third variable array that contains integers is number-of-words-in-layer 34. This is a variable array that keeps track of the number of words that remain unsorted in each layer 42. The term "layer 42" refers to the position of the letter in the word. The position of the letter in the word is an incremental advancer 35 for number-of-words-in-layer 34, thereby providing a way to keep track of how many words are sorted on each layer. For example, after grouping words according to their first letter, the number-of-words-in-layer[1] 34 has a value equal to the number of words in oldlist 26. When this variable turns up a value of one, then that indicates that no further sorting on this layer is necessary and that the one word needs to be added to newlist 28.

Last-letter-sorted 36 is a variable array that serves as the second index 60 of lettertracker 30. This variable keeps track of the last letter in each layer 42 by which sorting was done. For example, when the first sorting pass groups together all the words that begin with "A", and when it further re-groups them by their second letter, by their third letter, and so on, until the entire original "A" group is sorted, then the computer needs to know which letter to look at next when searching for the next group to sort. It needs to know that the "B" group is next. In this case, last-letter-sorted[1] 36 would have a value of 65. The 1 corresponds to the position of the letter in the word which also corresponds to a memory position 37 of this variable (i.e., its layer 42), and the 65 corresponds to the ASCII value of "A".

The present embodiment of this invention includes miscellaneous integer variables. Variable 38 counts the number of words in oldlist 26. Variable 40 keeps track of the number of words in new list as they are added one by one. When 40 is equal to 38 then the sorting process is complete. Variable (layer) 42 is used as the incremental advancer 35 of number-of-words-in-layer 34 and to keep track of which layer the sorting operation is working on. Other integer variables serve as temporary holding places for values as the sorting process needs them. Such integer variables are x 44, z 46, and xx 48.

Most of the variables are initialized before the sorting process begins. Lettertracker 30, number-of-words-in-layer 34, 38, and 40 are all set to zero. The variable (layer) 42 is initialized to 1. The variable array oldlist 26 is initialized to the character that corresponds to starting letter plus one.

FIRST SORTING PASS

FIG. 4 shows an example of how values are stored in memory during the first sorting pass and how words are categorized according to their first letter.

The first sorting pass receives words from an outside source, usually a disk file, stores each word one by one into the variable oldlist 26, assigns each word its word number 27 according to its position in oldlist 26, and categorizes each word according to its first letter. The step-by-step process is as follows:

The present invention receives words, one by one, from an outside source. These words are alphanumeric character strings, such as zip codes, names or addresses. As each word is received, five operations are done within the memory of the computer.

Step one, the value of the integer variable 38 (i.e. the number of words in oldlist 26) is increased by one. Since it was initialized as zero, its value when the first word is received is one. In other words, this variable counts the words as they enter. It thereby serves as the word number 27 for the variable oldlist 26.

Step two, the word is stored into the variable oldlist 26. Oldlist 26 uses variable 38 for its word number 27 to point to specific memory locations in its array. Thus, when variable 38 is 1 (one), then the word stored at oldlist[38] 26 is the first word received. For example, in FIG. 4 CONNOR is stored in oldlist[1] 26, ADAMS is stored in oldlist[2] 26, and so on.

Step three, the first letter of the word is changed into its corresponding ASCII value and stored into an integer variable 44. This is done so that 44 can later be used as the second index 60 of the variable lettertracker 30 and thereby categorize the word according to its first letter. In FIG. 4, the second index 60 of lettertracker 30 shows as a letter for the sake of clarity, but in the computer's memory it is the letter's ASCII value.

Step four, the value of lettertracker 30 is stored into wordtracker 32. Because lettertracker 30 is a two-dimensional array, it has two indexes to define its memory locations. For the entire first sorting pass it has a first index 58 of 1 (one), because 1 (one) corresponds to letter one of the word, the first letter by virtue of its position, the letter by which the word is categorized. The ASCII value of the letter derived from step three above and stored into variable 44 serves as the second index 60 of lettertracker 30. For example, the memory location at lettertracker[1,65] 30 is used to temporarily store the word number 27 of words that have a first letter of "A". The value stored at this location in lettertracker 30 was initialized to 0 (zero), so when the first word that begins with "A" is encountered, the value at lettertracker[1,65] 30 is still 0 (zero). Step five that follows will change this value to the word number 27 of the word in oldlist 26. Therefore, the second and following times that a word beginning with "A" is encountered, the value of lettertracker[1,65] 30 will be an integer greater than zero, and this integer will correspond to the word number 27 of the previous word in oldlist 26 that began with "A". The current value of lettertracker 30 at that point, whether it be 0 (zero), is stored into wordtracker 32. The array wordtracker 32 uses variable 38 as its counter 33 which is the same value as the word number 27 of oldlist 26.

For example, in FIG. 4 ADAMS is the second word received but is the first word that begins with "A". Thus, the value 0 (zero) is stored into wordtracker[2] 32, the counter 33 being 2, connoting the second word received, and the value 0 (zero) connoting that no previous word began with "A". Also in FIG. 4, ALLEN is the third word received but is second word beginning with "A". Thus, the value 2 is stored into wordtracker[3] 32, the counter 33 being 3, connoting the third word received, and the value 2 corresponding to the word number 27 of the previous word that began with "A", namely ADAMS.

Step five, the value of variable 38 is stored into lettertracker 30. The indexes used for lettertracker 30 are the same as those used in step four above. For example, in FIG. 4 the third word received begins with "A"; and so the value of variable 38 is 3 (corresponding to the word number 27, i.e., word 3) and the value of 44 is 65 (corresponding to the ASCII value of "A"). Thus the value of lettertracker[1,65] 30 becomes 3.

These five steps repeat until all the words have been received from the outside source.

The order of steps four and five are important. The value of lettertracker 30 changes in step five, but it is the old value of lettertracker 30 that is stored into wordtracker 32 before that change. The has the effect of categorizing the words according to their first letter, and it puts their locations into memory in such a way that they can be retrieved.

For example, when the first sorting pass is completed, all the words beginning with "A" are grouped together in this manner: lettertracker 30 remembers the most recent word, and wordtracker 32 remembers the rest of the words. In other words, the value of lettertracker 30 corresponds to the counter 33 of wordtracker 32 which also corresponds to the word number 27 of a word in oldlist 26. The value of wordtracker 32 at that counter 33 corresponds to another counter 33 of wordtracker 32 which also corresponds to the word number 27 of another word in oldlist 26. In this way, the value of wordtracker 32 leads to another counter 33, which leads to another value, which leads to another counter 33, which leads to another value, and so on until a value of 0 (zero) is reached. All of these values except the final 0 (zero) correspond to word numbers 27 of words in oldlist 26. In this way wordtracker 32 remembers all the words that begin with "A" and links them together like a chain.

For example, in FIG. 4, the final value of lettertracker 30 points to word 7 (ANDERSON). This corresponds to counter 33 7 of wordtracker 32 which contains a value of 5, pointing to word 5 (ADCOCK). This corresponds to counter 33 5 of wordtracker 32 which contains a value of 3, pointing to word 3 (ALLEN). This corresponds to counter 33 3 of wordtracker 32 which contains a value of 2, pointing to word 2 (ADAMS). In this way, all the "A" words are linked together in memory in such a way that they can be quickly retrieved.

After the first sorting pass, two transitional operations are done before the second sorting pass.

First, when all words have been received into oldlist 26, then the total number of words is stored into the variable number-of-words-in-layer 34 with the incremental advancer 30 of 1 (one). The 1 (one) corresponds to the position of the letter being sorted; because the first sorting pass used the first letter of each word. For example, if 100 words were received, then the value of number-of-words-in-layer[1] 34 becomes 100.

Second, the value of the constant starting-letter 24 is stored into the variable array last-letter-sorted 36 in a memory position 37 1 (one), the 1 (one) corresponding to the first letter of the word by which sorting has been done. For example, if starting-letter 24 has a value of 31 as suggested in the discussion above about constants, then the value of last-letter-sorted[1] 36 becomes 31.

The values derived at these two transitional steps will be used in the second sorting pass.

SECOND AND REPEATED SORTING PASSES

After the first sorting pass has subdivided the words into groups according to the first letter, the second sorting pass takes the first group and further subdivides it according to the second letter. Repeated sorting passes do repeated subdividing. The goal is to subdivide until only one word remains in a group. When a word is in a category all by itself, then it is sorted, and the operation moves on to the next group for further subdividing until all the groups have been exhausted and all the words have been sorted. See FIGS. 5-7.

The process of the second and repeated sorting passes is similar to that of the first sorting pass, with some differences. One difference is that the first sorting pass looks at each word, but the second sorting looks at some of the words. Out of the entire list of words, the second sorting pass selects a chain of words as they are linked together in wordtracker 32. Repeated sorting passes select other chains of words as wordtracker 32 has grouped them together. The chains of words as wordtracker 32 has linked them together are groups of words that have been grouped according to letter. Wordtracker 32 keeps tracks of these groups, and makes it possible to handle an unlimited number of word combinations within the limited memory of a computer.

Another difference between the first sorting pass and the second and repeated sorting passes is that the operation has to keep track of which group to subdivide next.

The operation always looks for the first or highest group to work on. For example, after the first sorting pass, the first or highest group is typically the group of words that begin with "A". Thus, in FIG. 5 the operation looks at ANDERSON, ADCOCK, ALLEN, and ADAMS. After subdividing the "A" group, the highest group is now typically a small part of the original "A" group. For example, in FIG. 6 the operation looks at ADAMS and ADCOCK because those words both begin with "AD". If only one word were to begin with "AD", then it would be added to newlist 28, and the operation would look at the next highest group. In other words, whatever group is first in alphabetical order is the first and highest group. The second sorting pass begins by looking for this first group.

To look for the first group to sort, the integer variable last-letter-sorted 36 is repeatedly increased by 1 (one) until lettertracker 30 is greater than 0 (zero). The array last-letter-sorted 36 uses the value of the variable (layer) 42 for its memory position 37 in order to keep track of the layer the operation is working on. In this example, last-letter-sorted[42] 36 begins with a value of 31, because that was the value assigned to it after the previous sorting pass. The two-dimensional array lettertracker 30 uses the variable (layer) 42 as its first index 58 to keep track of the layer, and it uses last-letter-sorted[42] 36 as its second index 60 to keep track of what letter of the alphabet to work with. The function of lettertracker 30, as discussed above, is to recall the location of the most recent word that began with any given letter. The value of lettertracker 30 at any point in its array corresponds to the location of a word in oldlist 26, providing that value is greater than 0 (zero). But if that value is 0 (zero), then there is no word that corresponds. In other words, a lettertracker 30 value of 0 (zero) reveals that there is no such word with a particular letter in a particular position of the word to be concerned about sorting at this particular time in the operation. That is why last-letter-sorted 36, the second index 60 of lettertracker 30, is repeatedly increased by 1 (one) until lettertracker 30 turns up a value greater than 0 (zero). When a value greater than 0 (zero) turns up, then the first and highest group of words has been found. This highest group of words has been categorized by the letter of which last-letter-sorted 36 is its ASCII value. For example, if last-letter-sorted 36 is 65, then the corresponding letter is "A", and lettertracker[42,65] 30 has a value corresponding to the most recent "A" word in oldlist 26.

This word in oldlist 26, thus found by lettertracker 30, is the first word in the group of words that the next sorting pass will process. All words in this group have the same letter at a particular position in the word; so the next sorting pass looks at the letter next in position. The next sorting pass takes six steps as follows:

Step one, the next letter of the word is changed into an integer corresponding to its ASCII value. This value is stored into the integer variable 46. The variable 46 can now be used for the second index 60 of lettertracker 30 in step 3 below, and this provides a means to categorize words by letter.

Step two, the value of wordtracker 32 that lettertracker 30 corresponds to is temporarily stored into the integer variable 48, so that it can be recalled later in step 6.

Step three, the value of wordtracker 32 that corresponds to lettertracker 30 (using the variable [layer] 42 for its first index 58 and using the ASCII value of the current letter for its second index 60) is now changed into the value of lettertracker 30 (using the next layer [i.e. 42 plus one] as its first index 58 and using the value of 46 arrived at in step one above as its second index 60). The function of wordtracker 32, as discussed above, is to keep track of groups of words linked together as a chain. This step has the effect of forging a new chain, linking words together a different way, because the words are being re-grouped.

Step four, the value at lettertracker 30 (using the value of 42 as its first index 58 and using the ASCII value of the current letter as its second index 60) is stored into lettertracker 30 (using the next layer [i.e. 42 plus one] as its first index 58 and using the ASCII value of the letter next in position in the word as its second index 60). The effect is that lettertracker 30 remembers the location of the most recent word.

Step five, because another word was sorted on the next layer, the value of number-of-words-in-layer 34 (using the next layer [i.e. 42 plus one] as its incremental advancer 35) is increased by one. This keeps track of how many words are sorted on the next layer.

Step six, the value of 48 remembered in step two above is recalled and evaluated. This value points to the word number 27 of the next word to sort. If this value is greater than 0 (zero) then the operation repeats steps one through six with this next word. If this value is 0 (zero) then there are no more words in this group to sort, and the operation moves on to another evaluation.

If the value of the variable number-of-words-in-layer 34 (using the next layer [i.e. 42 plus one] as its incremental advancer 35) is 1 (one), then sorting is completed for this group. A value of one here means that only one word exists on this layer, and no further subdividing of words can be done. Therefore, this one word is added to newlist 28. As the word is added to newlist 28, the value of the variable 40 is increased by 1 (one), because variable 40 counts the number of words in newlist 28. If the number of words in newlist 28 equals the number of words in oldlist 26, then the entire sorting operation is complete. If it is less, sorting continues.

After a word is added to newlist 28, three variables are reset to new values to prepare the operation to subdivide the next group of words. These are as follows:

The variable lettertracker 30 (using the next layer [i.e. 42 plus one] as its first index 58 and using the variable 46 [i.e. the letter value] as its second index 60) is set to 0 (zero). The zero indicates that this memory location in lettertracker 30 no longer remembers a word that needs sorting because the word is already sorted and added to newlist 28.

The variable number-of-words-on-layer 34 (using all the incremental advancers 35 from 1 to the next layer [i.e. 42 plus one]) is decreased by one. This decrease indicates that there is now one less word on each of these layers that remains to be sorted.

The variable (layer) 42 is repeatedly decreased by 1 (one) until the variable number-of-words-on-layer 34 (using the variable [layer] 42 for its incremental advancer 35) is equal to more than 0 (zero). This returns the operation to the next lower layer on which there are words to sort.

After these three variables are reset, the operation looks for the first group to sort. As described above before the six steps of the second and repeated sorting passes, the integer variable last-letter-sorted 36 is repeatedly increased by 1 (one) until lettertracker 30 is greater than 0 (zero). The array last-letter-sorted 36 uses the variable (layer) 42 as its memory position 37 because 42 keeps track of the layer the operation is working on. At this point in the operation, last-letter-sorted[42] 36 typically has a value greater than 31 with which it started, because it retains the value last arrived at. Therefore, if last-letter-sorted[42] 36 is the ASCII value of the letter M, then the operation will next check for "N" instead of going all the way back to "A".

After the highest group of words is found, the operation subdivides that group by repeating the six steps above.

If after completing the six steps above, the evaluation of number-of-words-on-layer 34 (using the next layer [i.e. 42 plus one] as its incremental advancer 35) results in a value greater than 1 (one), then there is a group of words that need further subdividing. To prepare the operation for further subdividing, two variables are set to new values. They are as follows:

The variable (layer) 42 is increased by 1 (one). This puts the operation on the next higher layer. In other words, if sorting was just completed on the second letter of the word, sorting will now continue on the third letter of the word.

The variable last-letter-sorted 36 (using the variable (layer) 42 as its memory position 37) is now set to the constant starting-letter 24. This insures that the operation will start before the beginning of the alphabet for the next re-grouping phase.

After these two variables are reset, the operation looks for the first group to sort. As described above before the six steps of the second and repeated sorting passes, the integer variable last-letter-sorted 36 is repeatedly increased by 1 (one) until lettertracker 30 is greater than 0 (zero). The array last-letter-sorted 36 uses the variable (layer) 42 for its memory position 37, because 42 keeps track of the layer the operation is working on. In this example, last-letter-sorted[42] 36 has a value of 31, because it has been reset to that value so that the operation will start before the beginning of the alphabet for the next re-grouping of words.

After the highest group of words is found, the operation subdivides that group by repeating the six steps above.

In the case of duplicate words, the value of the variable (layer) 42 will eventually reach the constant maximum-word-length 20. When this happens, the group of words cannot be subdivided further, and so the duplicate words are added to newlist 28.

When the entire sorting operation is complete, the words are sent to an outside apparatus, typically a disk file, a video display terminal, or a printer. The words can be sent one at a time during the sorting operation or they all can be sent at the end of the sorting operation.

CODING DETAILS

No particular programming language has been indicated for carrying out the various procedures described above. This is in part due to the fact that not all languages that might be mentioned are universally available. Each user of a particular computer will be aware of the language which is most suitable for his immediate purpose.

For illustrative purposes a program written in PASCAL that embodies the present invention is attached.

Thus, a method for computerized sorting of data has been disclosed. The present invention's method of grouping words letter by letter makes it possible to sort a list much more quickly than the prior art allows. Further, the memory means provided to group and regroup words makes it possible to use this method within the limited memory of a computer.

While the present invention has been particularly described with reference to FIGS. 1-9 and with emphasis on certain variable names, it should be understood that the figures are for illustration only and should not be taken as limitations upon the invention. In addition, it is clear that the methods and variables of the present invention have utility in any application where sorting or searching is desired. It is contemplated that many changes and modifications may be made, by one of ordinary skill in the art, without departing from the spirit and scope of the invention as described above.

I claim:

1. In a radix sorting method for computing equipment, in which words are sorted by association with their individual characters, said characters in said words consisting of any computer recognizable character including alphabetic letters, numbers, or other character represented by the American Standard Code for Information Interchange, the steps comprising:

assigning each said word a numerical value in order of appearance on a list, so that the first word or number has the value of 1, the second word has the value of 2, and so on;

storing in memory said numerical values that belong to each said word such that individual words can be individually remembered and recalled during the sorting process;

assigning a lettertracker array in the computers memory, said lettertracker being indexed in two dimensions, one dimension corresponding to the position of a letter in a word, the other index corresponding to a value of a letter on a value chart such as the American Standard Code for Information Interchange, and using said lettertracker to keep track of individual letters by which words are being sorted during the sorting process comprising the step of:

(a) using said lettertracker to hold in memory said numerical values of words in such a way that the indexes of said lettertracker point to a specific letter and to the position of that letter within a word, and that said numerical value stored at those indexes corresponds to the appearance location of said word on the list, providing a way to easily recall said word for further processing;

assigning a wordtracker array in the computers memory, said wordtracker being indexed in one dimension, and using said wordtracker to hold in memory said numerical values of words in such a way that groups of words are linked together because the numerical value of a word at one index equals the index at which the numerical value of the next word is stored, the radix sorting method further comprising the steps of:

recalling a first word in a group of words, for the purpose of further sorting that group of words, by matching said numerical value in said lettertracker to the index of said wordtracker;

using the numerical value of the first word in said group of words to recall from memory the rest of the words in said group of words, each said numerical value of a word corresponding to an index of said wordtracker, at which index the numerical value of another word is stored, which corresponds to the next index, and so on, until all words in said group of words are recalled;

changing the values in said wordtracker and said lettertracker as said words are recalled, with the result that said group of words is subdivided into smaller groups, the words in each smaller group being linked together by the indexes and newly changed numerical values in said lettertracker and said wordtracker;

repeatedly subdividing said groups of words into smaller groups, by changing the numerical values stored in said lettertracker and said wordtracker, until only one word remains in each group, with the result that all said words are alphabetically sorted.

2. In a radix sorting method for computing equipment, in which words are sorted by association with their individual characters, said characters in said words consisting of any computer recognizable character including alphabetic letters, numbers, or other character represented by the American Standard Code for Information Interchange, the steps comprising:

(a) assigning a wordtracker array equal in length to a list of words being sorted, said wordtracker array being a single-dimensional array of integers in a computers memory, each memory location in said wordtracker being identified, or located in memory, by its index, with the result that each memory location in wordtracker is identified by one index, and each memory location itself holds one integer;

(b) assigning a letter tracker array equal in length to the number of characters in the longest word in the list, and equal in width to the range of values of the characters being sorted, such as 0 through 9 for numerical sorting or 0 through 255 for the full range of computer recognizable characters, said lettertracker array being a two dimensional array of integers in a computers memory, one dimension corresponding to the position of a particular character in a word, counting the first character as being in the first position, the second character as being in the second position, and so on, and the other dimension corresponding to the ASCII values of characters, ranging in count from 0 through 255, with the result that each memory location in said lettertracker is identified, or located in memory, by its two indexes, one index corresponding to the position of a character in a word and the other index corresponding to the ASCII value of that same character, and the memory location itself holds one integer;

(c) initializing all memory locations in said wordtracker and said lettertracker to zero, so that the integer zero is stored in all memory locations of both arrays before sorting begins;

(d) the steps of storing different integers in said wordtracker and said lettertracker, changing the integer in one memory location at a time, as sorting proceeds, according to the following steps:

(1) after a character of a word is examined, as is the manner of radix sorting, locating the particular memory location in lettertracker that corresponds to the letter just examined, so that one index of lettertracker corresponds to the position of the character in the word, and the other index corresponds to the ASCII value of that same character, and once located, the integer held at that location is put into a certain memory location in wordtracker in the following manner:

(2) wordtracker receives the integer just located in lettertracker and stores that same integer in its next memory location, said next memory location is determined in one of two ways:

(i) during the first sorting pass, in which the first character of each word is being examined, as in the manner of radix sorting, the next memory location of wordtracker is found by the sequential counting of its index, so that the first memory location is used for processing the first word, the second memory location is used for processing the second word, and so on;

(ii) during subsequent sorting passes, in which the second or following characters of each word is being examined, as is the manner of radix sorting, the next memory location used in wordtracker is not necessarily sequential, but rather is located either by the integer held in the previously accessed location of lettertracker when the word being processed is the first in a group of words, or by the integer held in the previously accessed location of wordtracker when the word being processed is the second or following word in a group of words, such that said integer previously accessed (whether from wordtracker or from lettertracker) corresponds to an index of wordtracker, said index being wordtrackers said next memory location, so that if the integer previously accessed were 10, then the next memory location used in wordtracker would be 10, in a like manner, the integer held in the newly located memory position in wordtracker, before said integer is replaced, will locate the next memory location in wordtracker where the next integer is to be stored;

(3) after wordtracker receives said integer from lettertracker, then lettertracker receives a new integer which is stored in the identical memory location previously located in lettertracker, replacing the integer that was formerly held there, said new integer corresponding to the memory location, or index, of wordtracker most recently located, so that lettertracker remembers the last accessed location of wordtracker.

3. The method of claim 2, whereby the storing of integers in one location at a time in wordtracker and lettertracker has the following functions and results:

(1) if an integer in wordtracker is greater than zero, the that integer corresponds to the next memory location to be located in wordtracker, such that the integer 10 in any memory location of wordtracker points to the 10th memory location of wordtracker and to whatever integer may be stored in that location;

(2) any non-zero integer in wordtracker also identifies a particular word in the list being sorted, such that the integer 10 corresponds to the tenth word in the list, and so on, so that wordtracker acts as a linking mechanism, linking words together in groups, because the integer in one location points to another location, and therefore to another word also, so that words can be examined one by one in a particular order;

(3) if an integer in wordtracker equals zero, then that signals the end of a current group of words, and so the sorting process continues on a different group of words as follows:
  i. if a group of words just finished needs no further subdividing, as is the manner in radix sorting, then the sorted word or words are added to a sorted list, and the sorting process continues on a next group of words;
  ii. if the group of words just finished needs further subdividing, as is the manner in radix sorting, then the sorting process continues on a subgroup within the group just finished;
(4) if an integer in lettertracker is greater than zero, then it locates a first word in a group of words, because said integer corresponds to a memory location in wordtracker, such that the integer 10 in lettertracker points to the tenth memory location in wordtracker, which location holds another integer that points to the first word in a group of words, such that the integer 10 in wordtracker signifies that the tenth word in the list being sorted is the first word in a group of words within that list;
(5) if an integer in lettertracker equals zero, then that signifies an empty group of words, namely no words within a particular letter in a particular position of a word are currently being processed;
(6) after one group of words is processed, examining the integers in lettertracker in sequential order locates a next group of words to be processed, because an integer of zero indicates passing over that empty group, and a non-zero integer indicates the next group to process.

* * * * *